(No Model.)
J. R. BRADEN.
TREE PROTECTOR.
No. 605,776. Patented June 14, 1898.
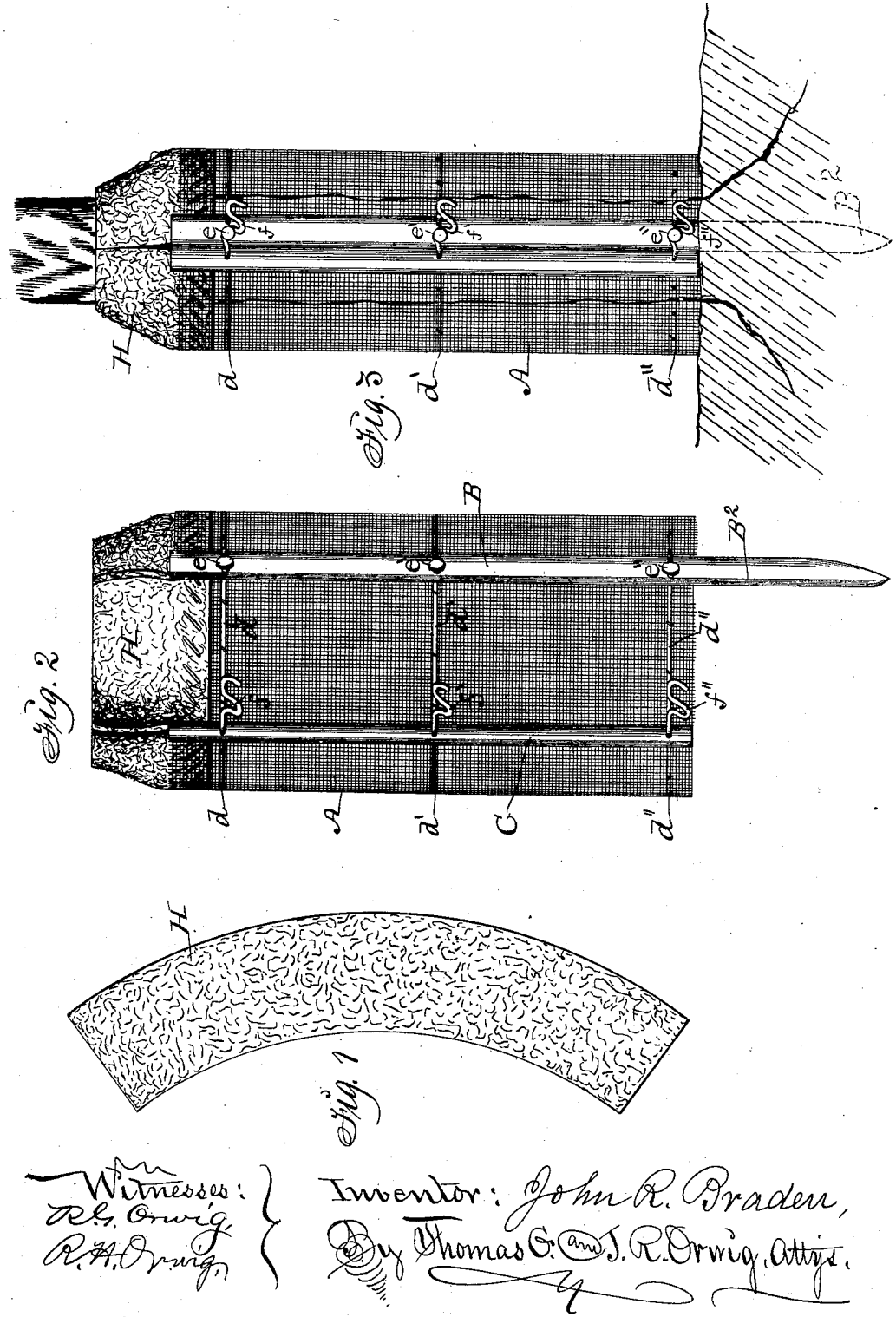
Witnesses: R. G. Orwig, R. H. Orwig
Inventor: John R. Braden, By Thomas G. and J. R. Orwig, Attys.

UNITED STATES PATENT OFFICE.

JOHN ROZELL BRADEN, OF RONAN, IOWA.

TREE-PROTECTOR.

SPECIFICATION forming part of Letters Patent No. 605,776, dated June 14, 1898.

Application filed August 27, 1897. Serial No. 649,746. (No model.)

*To all whom it may concern:*

Be it known that I, JOHN ROZELL BRADEN, a citizen of the United States, residing at Ronan, in the county of Wright and State of Iowa, have invented a new and useful Tree-Protector, of which the following is a specification.

My object is to provide a simple, convenient, and durable device for protecting trees from rabbits, horses, and other animals that bite off bark, and also from insects and parasites that travel up on the bark and infest the branches and leaves and impair the health and beauty of shade-trees and the productiveness of fruit-trees.

My invention consists in the expansible wire guard or fender and the flexible bibulous top adapted to be saturated with adhesive matter and to be detachably connected with the trunk of a tree, combined as hereinafter set forth, pointed out in my claim, and illustrated in the accompanying drawings, in which—

Figure 1 is a diagrammatical view of a piece of bibulous felt material adapted to be fixed to the top of the flexible wire guard. Fig. 2 shows the complete device in an open position ready for use. Fig. 3 shows it applied to the trunk of a tree as required for practical use.

The letter A designates a quadrangular-shaped piece of woven wire that may vary in dimensions as required to suit trees of different sizes. Its parallel longitudinal edges are bound with strips of sheet metal B and C, that are folded together and over the edges of the woven wire and fastened thereto by means of cross-wires $d$, $d'$, and $d''$, that are extended through the doubled sheet-metal strips B and C and secured to the woven wire A by sewing or weaving fine wires around them and through the meshes of the woven-wire fabric.

Studs $e$, $e'$, and $e''$ are fixed to the metal binding-strip B and the ends of the wires $d$, $d'$, and $d''$ extended and formed into hooks $f$, $f'$, and $f''$, adapted to engage the studs, as required to fasten the parallel edges together when the device is placed around a tree, as shown in Fig. 3.

$B^2$ is an integral pointed extension at the lower end of the sheet-metal binding B, adapted to be pressed into the ground to aid in retaining the complete device in proper position relative to a tree.

H is a piece of felt material adapted to absorb kerosene, tar, or other matter that is destructive to insects and parasites that damage trees. Its longest curved edge is stitched fast to the top edge of the woven wire A by means of a wire thread or in any suitable way in such a manner that it will incline inward, as required to come in contact with the bark around a tree and form a barrier to insects passing upward on the surface of the tree and also as required to allow expansion as the growth of the tree increases its diameter at the point where the flexible material H comes in contact with the tree.

I claim as my invention—

A tree-protector, composed of the woven wire A, the metal binding-strip B having an extension $B^2$, and fixed studs $e$, $e'$, and $e''$, a metal binding-strip C, cross-wires $d$, $d'$, and $d''$, terminating in hooks $f$, $f'$, $f''$, and a flexible piece of fabric H fixed to the top of the woven wire A, as and for the purposes stated.

JOHN ROZELL BRADEN.

Witnesses:
E. M. EMERSON,
W. H. BINGHAM.